(12) United States Patent
Ayandeh et al.

(10) Patent No.: US 9,210,060 B2
(45) Date of Patent: Dec. 8, 2015

(54) FLOW CONTROL TRANSMISSION

(71) Applicant: Hewlett-Packard Development Company, L.P., Houston, TX (US)

(72) Inventors: Siamack Ayandeh, Concord, MA (US); Shilin Zhang, Roseville, CA (US); Barry A. Maskas, Sterling, MA (US)

(73) Assignee: HEWLETT-PACKARD DEVELOPMENT COMPANY, L.P., Houston, TX (US)

(*) Notice: Subject to any disclaimer, the term of this patent is extended or adjusted under 35 U.S.C. 154(b) by 301 days.

(21) Appl. No.: 13/835,320

(22) Filed: Mar. 15, 2013

(65) Prior Publication Data

US 2014/0280885 A1  Sep. 18, 2014

(51) Int. Cl.
*G06F 15/173* (2006.01)
*H04L 12/26* (2006.01)
*H04L 12/801* (2013.01)

(52) U.S. Cl.
CPC ............ *H04L 43/0894* (2013.01); *H04L 47/39* (2013.01)

(58) Field of Classification Search
USPC ........................................................ 709/224
See application file for complete search history.

(56) References Cited

U.S. PATENT DOCUMENTS 7,515,593 B2   4/2009   Devdas et al.
7,551,556 B2 * 6/2009   Henriques et al. ............ 370/230
7,573,821 B2   8/2009   Chilukoor et al.
8,477,689 B2 * 7/2013   Zhang et al. .................. 370/328
2010/0128605 A1 5/2010   Chavan et al.

OTHER PUBLICATIONS

Unknown., "Fibre Channel over Ethernet Management: Secure Storage Traffic in a Converged Network", Retrieved from http://www.cisco.com/en/US/solutions/collateral/ns340/ns517/ns224/ns945/ns1060/white_paper_c11-647658.pdf, Feb. 2013, 7 pages.
Unknown., "Policing and Shaping Overview", Retrieved from http://www.cisco.com/en/US/docs/ios/qos/configuration/guide/polcing_shping_oview.pdf, Feb. 2013, 10 pages.
Ayandeh, Siamack., "Fiber Channel 1:N Redundancy", U.S. Appl. No. 13/455,445, filed Apr. 25, 2012, 28 pages.
Ayandeh, Siamack., "Converged Fabric for FCoE", PCT Application No. PCT/US2012/035745, Filed Apr. 30, 2012, 26 pages.
Ayandeh, Siamack., "Inter Domain Link for Fibre Channel", PCT Application No. PCT/US2012/034995, Filed Apr. 25, 2012, 34 pages.

* cited by examiner

*Primary Examiner* — El Hadji Sall
(74) *Attorney, Agent, or Firm* — Brooks, Cameron & Huebsch, PLLC

(57) ABSTRACT

An example of flow control transmission can comprise receiving a transmission instruction at a transmitter. Data can be sent from the transmitter at a rate of transmission based on the transmission instruction. A rate of transmission can be monitored over a time interval to determine a difference between a minimum rate of transmission and the monitored rate of transmission over the time interval. The transmission instruction can be overridden and data released to maintain the minimum rate of transmission based on the monitored difference.

15 Claims, 3 Drawing Sheets

FLOW CONTROL TRANSMISSION

BACKGROUND

Computing networks can include multiple network devices including routers, switches, and hubs, computing devices such as servers, desktop PCs, laptops, workstations, and peripheral devices, e.g., printers, facsimile devices, and scanners, networked together across wired and/or wireless local and or wide area networks (LANs/WANs).

A communication network can use lossless operation (e.g., Fiber Channel (FC), Fiber Channel over Ethernet (FCoE) and data center bridging applications) for lossless Ethernet. The communication network can be within a datacenter and can also be used in a wide area network. Link-based flow control schemes can send data between network devices. While these schemes can work in a context of a local link, the schemes can pose issues known as head-of-line blocking in an end to end context of a switch fabric. For example, this HOL can cause back pressure throughout the fabric affecting traffic and flows to other unrelated targets.

DETAILED DESCRIPTION

Figure 1:
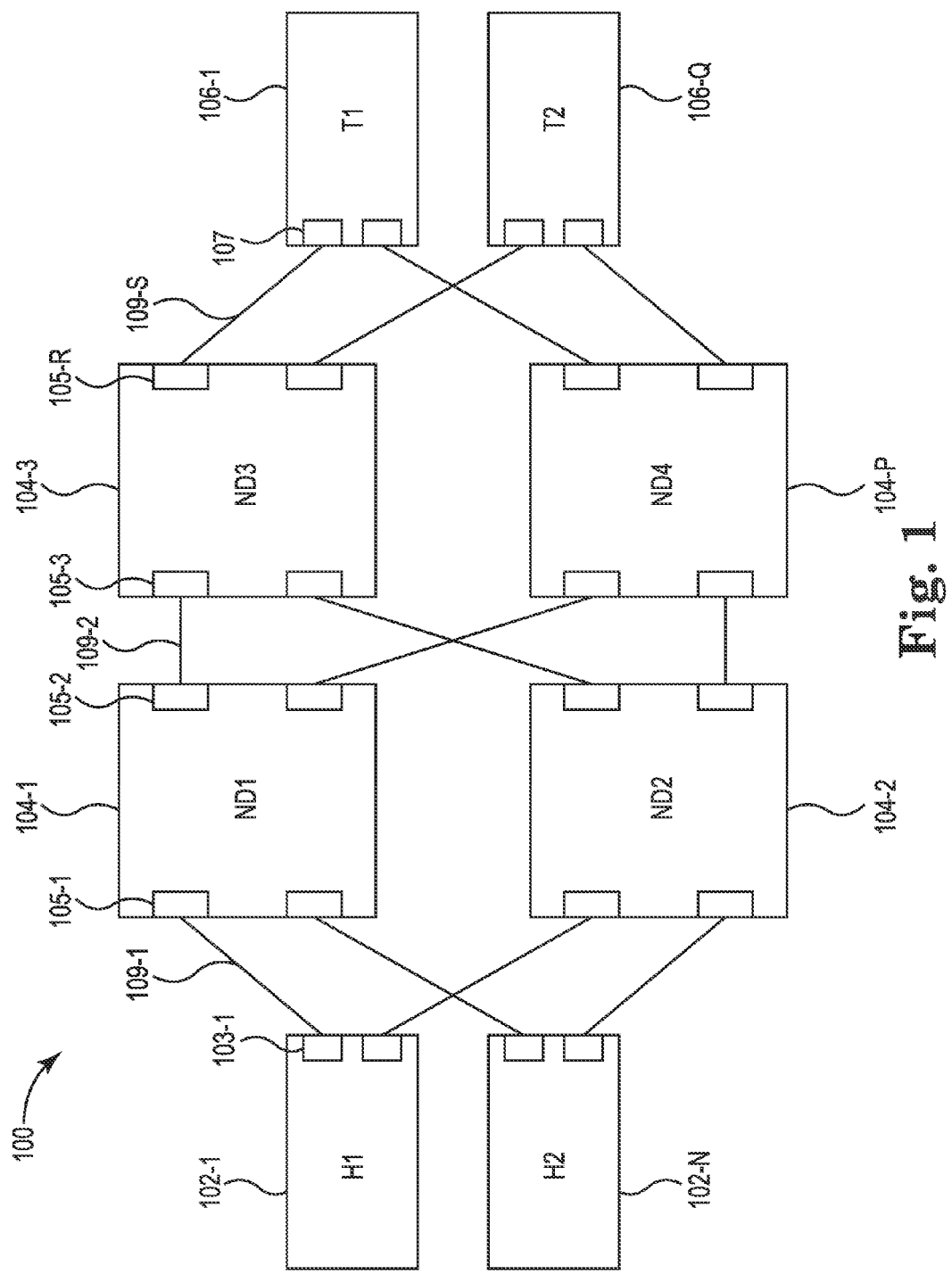
FIG. 1 illustrates an example of a network for flow control transmission according to the present disclosure.

A network can include a number of network devices. Network communication can occur between the number of network devices. For example, a host can communicate with a target device (e.g., a switch, a router, computing device, etc.) to transfer information (e.g., units of data, bytes, frames, pause frames, etc.) through a number of network devices. That is, a sending network device (e.g., a source) can include a transmitter to send units of data through a network to a receiver on a target (e.g., destination and/or receiving) network device. In a similar manner, a target device can also communicate back to the host. A target device operating at a lower speed than a host can slow down the faster host and therefore slow down the network and vice versa. Head-of-line-blocking (HOL) can occur where congestion at one port spreads to other ports and unrelated flows. HOL can be a side effect of link level, e.g., layer 2 (L2-data link layer) flow control. As a greater number of network devices are communicating in the network, the transfer of information can become more difficult. A flow control scheme can aid the communication of these network devices.

Flow control schemes can include a window based credit scheme (backbone 5 (BB5)) and a pause frame scheme (backbone 6 (BB6)). A window based flow control scheme can include a receiver (e.g., in a host, a switch, a router, a computing device, etc.) returning credits to a transmitter in a sending network device indicating the receiver received information from the sending network device. A credit can be a buffer-to-buffer credit (e.g., a BB_credit). The transmitter of the sending device may need to wait until a credit is received back to the sending network device before sending additional information. According to various network policies, in order for the receiver to allocate sufficient buffer space and insure that no information is lost.

A pause frame flow control scheme can include a receiver (e.g., in a host, a switch, a router, a computing device, etc.) that sends a pause frame to a transmitter when a receive queue 212 of the receiver exceeds a particular threshold. The pause frame can indicate to the transmitter a pause interval. A pause interval can include an integer multiple of a pause quanta. A pause quanta e.g. can be measured in terms of a time it takes to send 512 bytes of data or any other size. Both flow control schemes can limit a number of bytes which may be in transit between a transmitter and a receiver to insure lossless communication (e.g., FCoE).

Embodiments of the present disclosure may include network devices, systems, including executable instructions and/or logic thereon, and methods for flow control transmission. A network device includes executable instructions and/or logic to perform the actions and functions described herein In the following detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the embodiments of this disclosure, and it is to be understood that other examples may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 104 may reference element "04" in FIG. 1, and a similar element may be referenced as 204 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

As used herein, the designators "N," "P," "Q", "R", and "S," particularly with respect to reference numerals in the drawings, indicate that a number of the particular feature so designated can be included with examples of the present disclosure. The designators can represent the same or different numbers of the particular features.

FIG. 1 illustrates an example of a system for flow control transmission according to the present disclosure. A system for flow control transmission 100 can include a number of hosts H1, H2 (e.g., 102-1, . . . , 102-N), a number of network devices ND1, ND2, ND3, ND4 (e.g., 104-1, 104-2, 104-3, 104-P), and a number of target devices T1, T2 (e.g., 106-1, . . . , 106-Q). A network device can include a router, a switch, a computing device, etc. A collection of network devices which provide connectivity between a set of end points (e.g., hosts and targets) can be called a fabric. For the purpose of clarity, a particular number of hosts, network devices, and targets are shown in FIG. 1, but any number of hosts, network devices, and target devices can comprise and/or be connected to a fabric.

H1 102-1 can include a port 103-1 that is linked 109-1 to a port 105-1 of ND1 104-1. ND1 104-1 can be linked 109-2 to ND3 through port 105-2 and 105-3. ND3 can be linked 109-S to T1 106-1 through port 105-R and port 107. A network device port (e.g., 105-R) of a network device ND3 104-3 can buffer traffic based on a link 109-S to a port (e.g., 107) of a target device (e.g., T1 106-1). For example, T1 106-1 can affect a flow of information from ND3 104-3 to T1 106-1 if T1

106-1 is operating at a lower speed than ND3 104-3. This discrepancy in speed can lead to congestion of traffic and may spread through the network. For example, T1 106-1 operating at a slow speed can affect ND3 104-3, which in turn affects ND1 104-1 and H1 102-1, etc. As more hosts are added to the network, congestion can increase.

Previous approaches included dropping a frame if the frame was in a buffer for a predetermined amount of time (e.g., longer than a fabric-switch hold timer, longer than an edge-hold timer, etc.). A fabric-switch hold timer can be determined per fabric and can be divided among switching hops of the fabric. For example, a fabric-switch hold timer can be 500 milliseconds (ms) per switch. The edge-hold timer can be set for edge ports of a fabric that connect to hosts and targets. An edge-hold timer can be 100 ms, below the fabric hold time. However, the predetermined noted times are slow in comparison to switching rates on the order of microseconds ($\mu$s).

Figure 2:
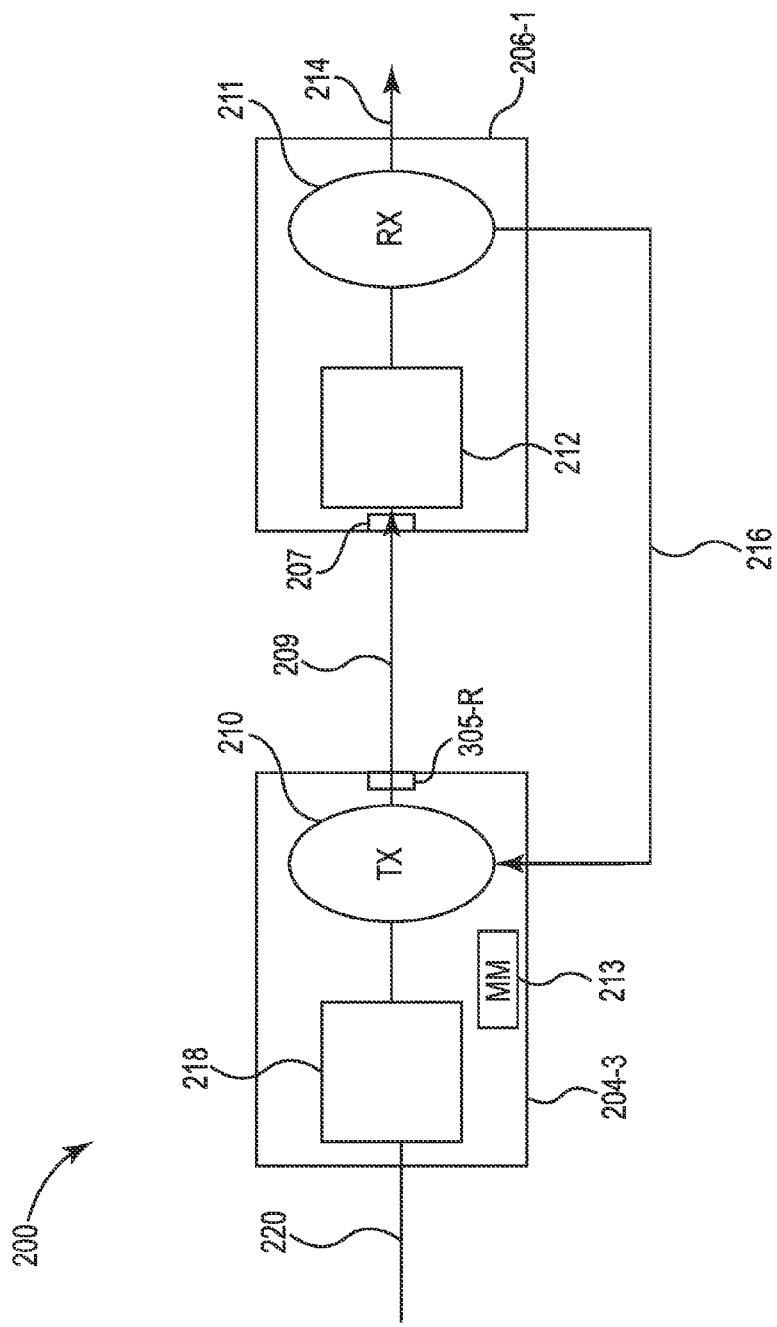
FIG. 2 illustrates an example of a system for flow control transmission according to the present disclosure.

FIG. 2 illustrates an example of a system for flow control transmission according to the present disclosure. The system for flow control transmission 200 can include a ND, e.g., 204-3, having a transmitter 210, a metering mechanism (e.g., logic), and a transmit queue 218 associated with a port, e.g., 205-R. The transmitter 210 can send data (e.g., bytes, frames, information, etc.) across a link, e.g., 209, to receive buffer 212 of a receiver 211 in another ND, e.g., a target device 206-1. The receive buffer 212 can be associated with a port, e.g., 207. A transmitter 210 can be limited to a transmission of a maximum of bytes of data B which is a window size (W) multiplied by a frame size. Hence B=W×max_frame_size. A frame can be an indivisible unit of information in a link layer which includes a start of frame, an end of frame delimiters, a header, and data portions. A frame can include data and control information for that data.

A receiver 211 in Nd 205-6 can send a transmission instruction 216 (e.g., a credit, a pause frame) to the transmitter 210 in ND 204-3 in response to receiving the data from transmitter 210 in ND 204-3. In a BB5 system, a transmission instruction 216, e.g., a credit, can indicate that a particular amount of data (e.g., bytes, frames) was received by a receiver 211 from transmitter 210. A transmitter 210 can receive a credit in order to send additional data to the receiver 211. A rate of transmission can be determined by a flow of data from a transmitter to a receiver and the transmitter receiving a credit. For example, 2 kb of data can be sent to a receiver which returns a credit for 2 kb. The time it takes the transmitter to send the data and receive the credit can determine a rate at which the transmitter sends more information. The transmission instruction 216, e.g., a credit, can indicate a particular amount of data that the receive buffer 212 has capacity to receive. A time $\tau$ can represent the time it takes a transmitter to send data, e.g., a frame, to a receiver and receive back a credit (e.g., a roundtrip time for the above loop in a system). A throughput of the system can be approximated by B/$\tau$ (e.g., bytes/second). The throughput can equal the lesser of the link bandwidth or receiver nodal capacity (i.e., receiver capacity to process frames). A delay caused by latency in the system can be referred to as queuing delay.

A metering mechanism (MM) 213 can count a number of bytes W*, and/or a close approximation (e.g., number of frames multiplied by a maximum or average expected frame size in bytes) transmitted, per t' interval, where t' is a number of $\tau$, e.g., ({1 ... n}×$\Sigma$($\tau$' is usually >$\Sigma$)). $\tau$' and a minimum rate of transmission of data can be configured (e.g., selected or predetermined through a command line interface (CLI) of the system). The MM 213 can allow the transmitter to release, e.g., transmit additional byes ("leak") a particular amount of bytes (e.g., W−W*) and/or equivalent number of frames through the link during this configurable interval (as long as bytes are queued in a transmit buffer 218). For example, a transmitter can send a particular amount of data to a receiver through a link based on the determination of W−W* (approximate equivalent number of bytes measured as number of frames). Alternatively frames may be dropped.

The MM 213 can allow the transmitter 210 to leak a particular amount of data so that a minimum rate of transmission is occurring from the transmitter. For example, if a MM determines that 5 kb/s are being transferred and the predetermined minimum rate of transmission is 10 kb/s, the transmitter can leak bytes from the transmitter to the link in order to maintain a 10 kb/s minimum rate of transmission.

A system error may have occurred when W* equals zero for a number of $\tau$ intervals. An error can generate an alarm for an operator to take action. An error can cause a flushing of frames from a transmit queue. A configuration can be provided for how to respond to an error. In one example, a link can be reset if frames are received in excess of an advertised credit (e.g., a credit sent to the transmitter).

In a BB6 system, a pause frame, e.g., Pause Flow Control (PFC) used by IEEE 802.13Qbb standard or similar scheme, can indicate that a threshold amount of data has been received at a receive buffer 212. A transmitter 210 can send data at a transmission rate until a pause frame (e.g., a transmission instruction 216) is received. The pause frame can include a byte count interval. A byte count interval can determine a number of bytes of silence expected across a link by the receiver. The transmitter can respond by waiting for a period of time based on the byte count interval before transmitting additional data.

A round trip $\tau$ of the above system can be a time it takes to transmit a frame to the receiver and receive a signal, e.g., a pause frame. A pause frame can indicate to the transmitter to pause per a particular link connected to the transmitter and/or a particular class of service. For example, one class of service distributed by a connection can be paused by a pause frame associated with the first class of service while a second class of service is not paused. A receive buffer 212 (e.g., buffer, queue) of the receiver can include a threshold (e.g., b bytes) which may be per link or per class of service. Once b is reached at the receive buffer 212, a pause frame can be transmitted to the transmitter (e.g., transmission instruction 216 in FIG. 2). A receiver can have sufficient buffer space beyond b to absorb transmissions during half a round trip time, $\tau$/2, which is the time to the receiver, overhead time, plus two times a maximum frame size (as the transmitter may have started to transmit as a pause frame arrives).

A throughput of the pause frame system can be indicated by the equation: line_rate (L)×(1−Pause_interval_ratio). The Pause_interval_ratio can be the fraction of time the transmitter is paused. For a class based pause, a maximum bandwidth L' can be allocated to a class of service which would replace a line rate (L) in the above equation for a given class of service.

A metering mechanism (MM) can be added to the system and can count a number of bytes (e.g., B*) per $\tau$' interval. The metering mechanism can be hardware that includes logic. The MM can allow the transmitter to release, e.g., transmit additional data (e.g., leak) a configured amount of bytes (e.g., B−B*) from the transmitter to a link during a time interval $\tau$'. For example, a current throughput (e.g., a number of bytes per time interval (B*)) can be subtracted from a total number of bytes (e.g., B) to determine an amount of data to leak to a receiver. A minimum desired throughput can be B/$\tau$'. Data can be leaked to reach the minimum desired throughput. An example of can be: {1 ... n}×τ. If B* is zero for a number of intervals, an error condition can exist. The error condition can generate an alarm for an operator to take action. An error condition can also cause a flushing of frames from a transmit queue. In one example, a connection (e.g., a link) can be reset if data (e.g., frames) is received in excess of configured buffer thresholds at the receiver. Other averaging schemes such as application of low pass filters can also be applied. Embodiments in this disclosure are by way of example only and are not limited to the schemes described.

The transmit buffer 218 can receive information from upstream 220 in the network (e.g., from a network device, a computing host, a router, a switch, target storage device, etc.). The receiver 211 can send the information it receives downstream 214 in the network (e.g., to a network device, a computing host, a router, a switch, target device, etc.). A network device 204-3 can include a transmitter 210 and a transmit buffer 218. A network device 206-1 can include a receiver 211 and a receive buffer 212. A network device can be a host, a router, a switch, a computing device, etc.

Figure 3:
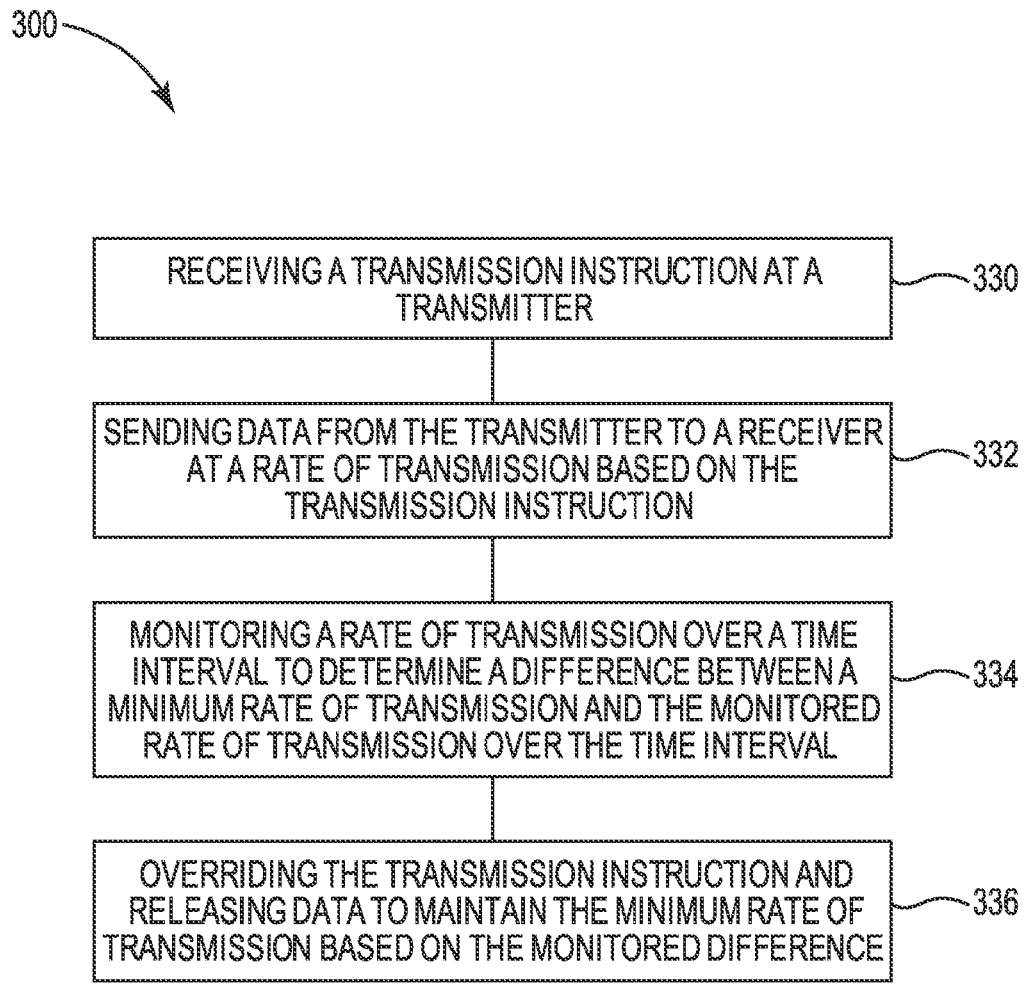
FIG. 3 illustrates an example of a method for flow control transmission according to the present disclosure.

FIG. 3 illustrates an example of a method for flow control transmission according to the present disclosure. At block 330, the method 300 comprises sending data from a transmitter (e.g., 210 in FIG. 2) to a receiver (e.g., 211 in FIG. 2) at a rate of transmission based on a transmission instruction. A transmission instruction can include a credit indicating that data has been received by the receiver. The credit can allow the transmitter to send additional data. A transmission instruction can include a pause frame that indicates to a transmitter that the receive buffer of a receiver has reached a threshold capacity. The pause frame can indicate a pause interval for the transmitter to wait before sending additional data. The transmission instruction can determine the rate of transmission based on a size of a receive buffer of the receiver and the receiver's ability to free up space in the receive buffer.

At block 332, the method 300 comprises monitoring a rate of transmission over a time interval to determine a difference between a minimum rate of transmission and the monitored rate of transmission over the time interval. Monitoring of data can be determined by a metering mechanism (MM) in connection with the transmitter and the link. The MM can monitor the rate of transmission of data onto the link being sent to the receiver. The MM can monitor an estimated rate of transmission based on the configuration of the system and known rates of transfer and reception. The MM can monitor a rate of transmission based on a speed of the link). The minimum rate of transmission can be a configured rate of transmission. The monitored rate of transmission can be subtracted from the minimum rate.

At block 334, the method 300 comprises leaking data to maintain the minimum rate of transmission based on the monitored difference. Data can be leaked across the link (i.e., sent to the receiver) based on a monitored difference between a current rate of transmission over a time interval and a minimum rate of transmission. For example, if a transmitter is sending data to a receiver and receiving a transmission instruction (e.g., a credit back at a rate of 5 kb/s and a minimum rate of transmission is configured to 10 kb/s, a transmitter can leak data across a link to a receiver to maintain the 10 kb/s. The leaking of data can be sent regardless if a transmission instruction is received by the transmitter.

If there is a loss of a transmission instruction (e.g., a credit or a pause frame does not get to the transmitter), leaking data across the link allows for data to continue to flow and can avoid backlogs. The transmitter can continue to send data even if the receiver has not sent all required credits and/or has sent a pause frame. A leaking of data can occur in smaller intervals and smaller amounts of data can be lost if an error occurs. In addition, backlogs in the fabric can be prevented or reduced because a minimum rate of transmission is occurring.

Data can be dropped from the transmit queue at granular intervals if an error occurs and a transmission rate goes down to zero for a particular period of time. Dropping data from the transmit queue can also prevent backlogs in the fabric. Flow control parameters can be renegotiated between a transmitter and a receiver periodically and leaking and/or dropping frames can accommodate such fluctuations in rate of transmission. In addition, each link can operate based on individual configurations and/or rates of transmission.

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor. The specification examples provide a description of the applications and use of the system and method of the present disclosure. Since many examples can be made without departing from the spirit and scope of the system and method of the present disclosure, this specification sets forth some of the many possible example configurations and implementations.

What is claimed:

1. A method comprising:
   receiving a transmission instruction at a transmitter;
   sending data from the transmitter to a receiver at a rate of transmission based on the transmission instruction;
   monitoring a rate of transmission over a time interval to determine a difference between a minimum rate of transmission and the monitored rate of transmission over the time interval; and
   overriding the transmission instruction and releasing data to maintain the minimum rate of transmission based on the monitored difference without receiving an additional transmission instruction by the transmitter.

2. The method of claim 1, wherein sending comprises sending a predetermined number of bytes, the predetermined number of bytes being a window size expressed as a set number of frames multiplied by a set frame size.

3. The method of claim 1, wherein the method comprises receiving the transmission instruction in a form of credits representing receipt of the sent data by the receiver.

4. The method of claim 1, wherein the method comprises receiving the transmission instruction in a form of a pause frame indicating the transmitter does not have permission to send additional data to the receiver.

5. The method of claim 4, wherein receiving the transmission instruction in the form of a pause frame comprises indicating to the transmitter a pause interval representing a period of time to not send data.

6. A network device comprising:
   a port for sending a unit of data and receiving a unit of data;
   a transmitter for sending a unit of data from the network device;
   a metering mechanism associated with the transmitter, wherein the metering mechanism comprises logic to:
      monitor an amount of data units sent during a time interval to calculate a monitored transmission rate;
      monitor a credit received to the network device indicating a unit of data was received from the network device; and
      release data from a queue of the transmitter based on a difference between the monitored transmission rate during the time interval and a minimum rate of data transmission without receiving a transmission instruction to send the released data.

7. The network device of claim 6, wherein the metering mechanism comprises logic to calculate a rate to release the data based on the monitored amount of data.

8. The network device of claim 7, wherein the metering mechanism calculates the rate to release the data by subtracting a determination of frames per round trip of the data from a window size of the data multiplied by a maximum frame size of the data.

9. The network device of claim 8, wherein releasing the data comprises leaking the data when the number of frames per roundtrip of the data equals zero.

10. The network device of claim 6, comprising the transmitter releasing additional data when the credit is received by the transmitter, wherein an amount of the additional data is in excess of the amount of the credited unit of data.

11. A network device comprising:
    a port for sending a unit of data and receiving a unit of data;
    a transmitter for sending data from a network device; and
    a metering mechanism associated with the transmitter, wherein the metering mechanism comprises logic to:
        determine a throughput of data units from the transmitter;
        detect a pause frame received to the network device indicating an amount of time for the network device to pause before sending additional data; and
        release data units from a queue associated with the transmitter at a rate based on a difference between the throughput and a minimum rate of data transmission without receiving an instruction by the transmitter to release the data units.

12. The network device claim 11, wherein the throughput is based on a rate of transmission of bytes and a pause interval ratio.

13. The network device of claim 11, wherein the pause frame indicates to the transmitter to pause for an interval of time.

14. The network device of claim 11, wherein data in the queue is flushed in excess of the release rate when a number of transmitted bytes for a plurality of time intervals is zero.

15. The network device of claim 11, wherein the throughput that causes a release of data from the transmitter is configurable.

* * * * *